Dec. 7, 1954 W. E. GRETZ 2,696,115
TEMPERATURE RECORDING APPARATUS FOR PASTEURIZERS
Filed Sept. 9, 1952 4 Sheets-Sheet 1
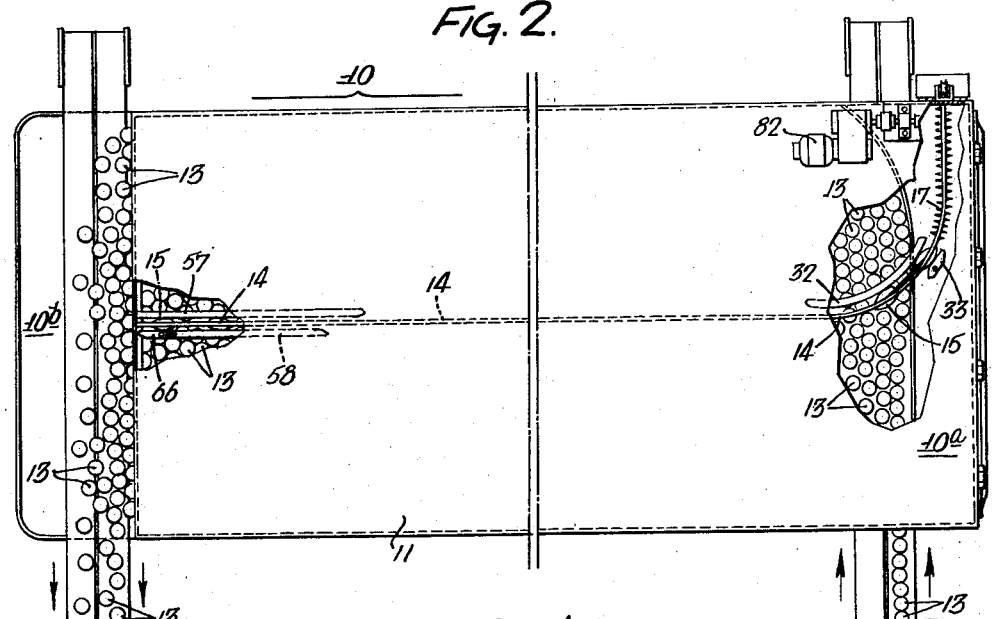
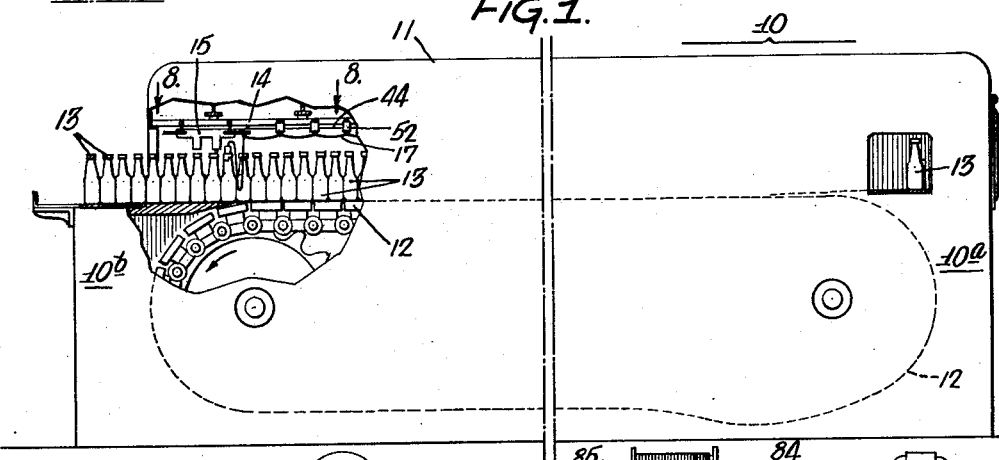
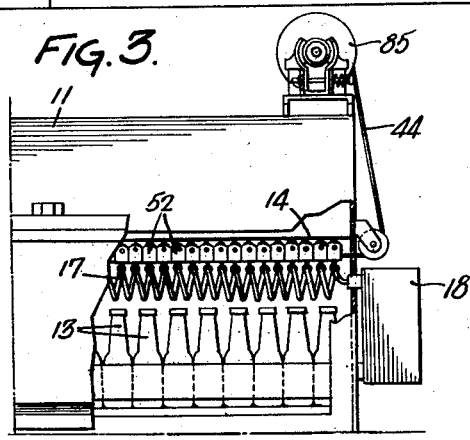
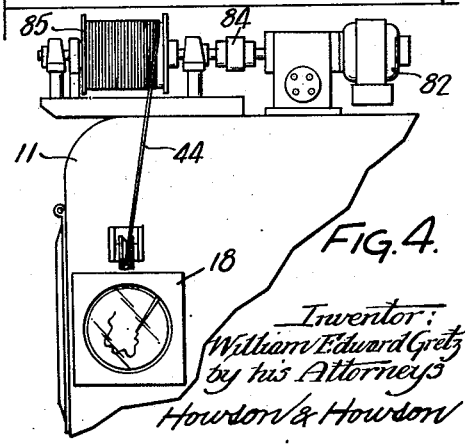
Inventor:
William Edward Gretz
by his Attorneys
Howson & Howson

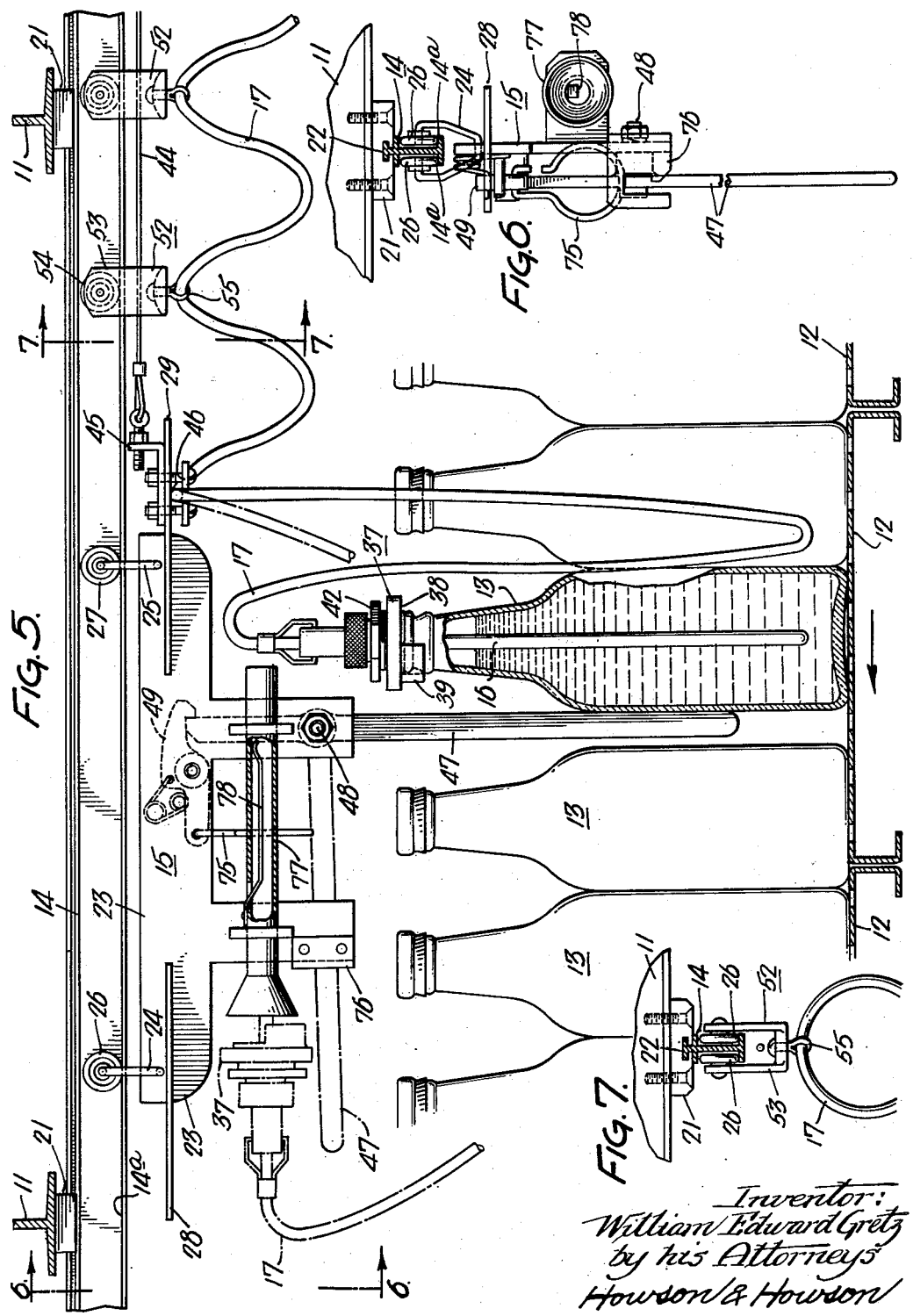

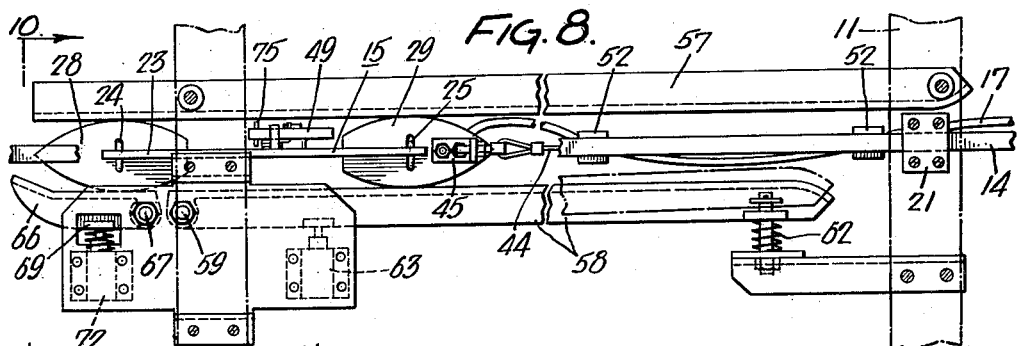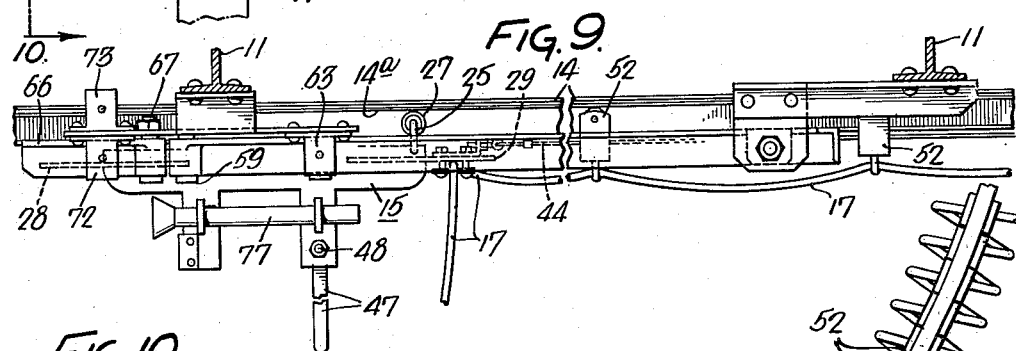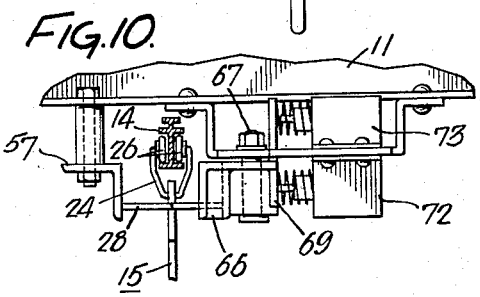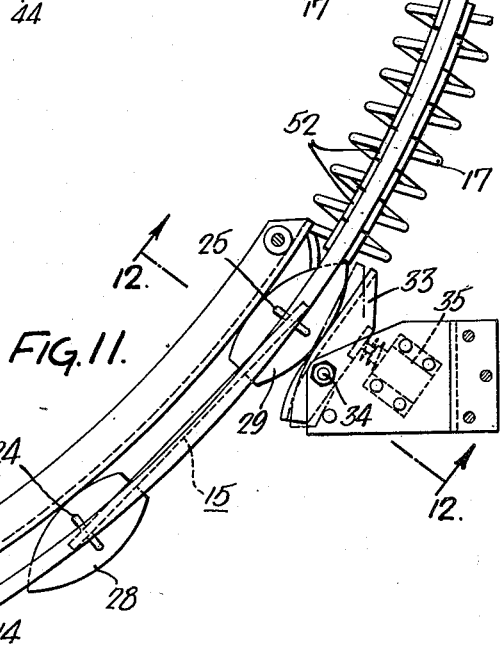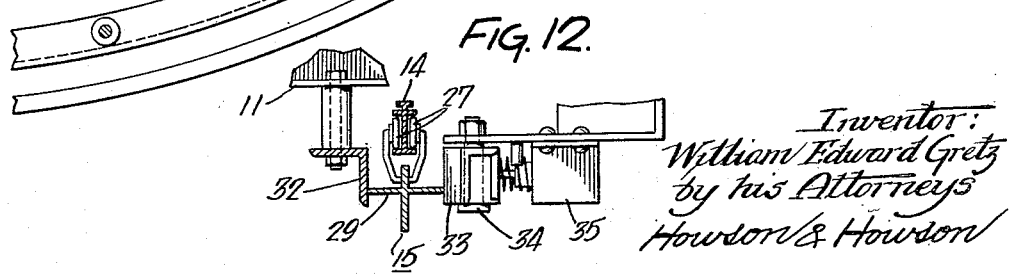

Dec. 7, 1954 W. E. GRETZ 2,696,115
TEMPERATURE RECORDING APPARATUS FOR PASTEURIZERS
Filed Sept. 9, 1952 4 Sheets-Sheet 4
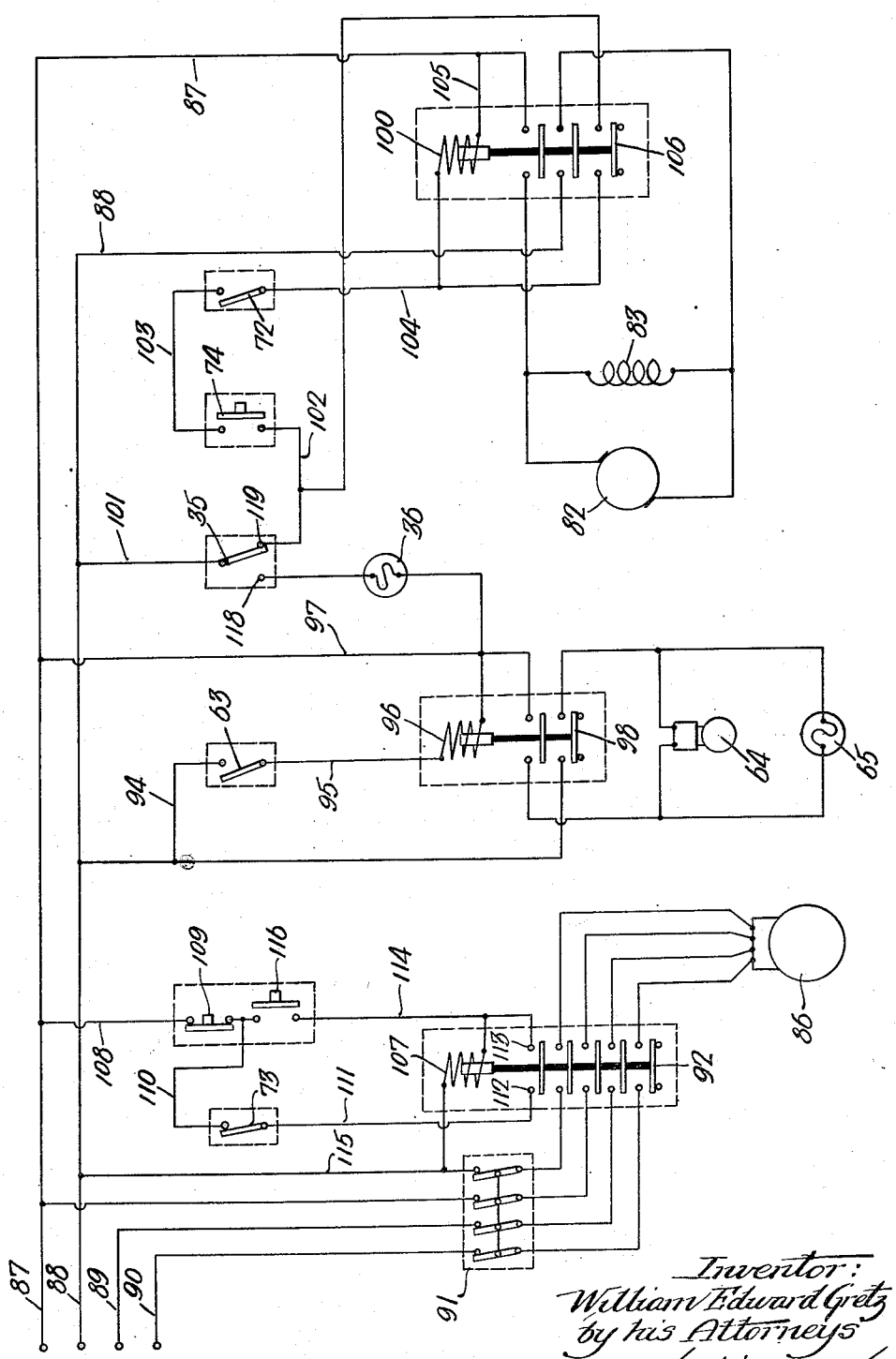

United States Patent Office 2,696,115
Patented Dec. 7, 1954

2,696,115

TEMPERATURE RECORDING APPARATUS FOR PASTEURIZERS

William Edward Gretz, Philadelphia, Pa.

Application September 9, 1952, Serial No. 308,640

14 Claims. (Cl. 73—343)

The present invention relates to new and useful improvements in temperature recording apparatus and more particularly to temperature recording apparatus capable of producing a continuous visible record of the temperature and time relationship of a liquid being pasteurized.

The principal object of the present invention is to provide novel temperature recording apparatus for pasteurizers wherein an accurate temperature-time record of a liquid passing through a pasteurizer may be obtained by inserting a temperature responsive instrument, such as a thermocouple, into the container carrying the liquid and transporting the thermocouple through the pasteurizer with the liquid container. When pasteurizing a liquid it is necessary that the liquid be maintained in a particular temperature range for a predetermined period of time to complete the pasteurizing process. Accordingly, in order to determine whether or not the pasteurizing process has been completed a temperature responsive instrument should be immersed in the liquid during the entire process and the temperature should be recorded on a continuous recording instrument.

Another object of the present invention is to provide novel temperature recording apparatus for pasteurizers wherein the temperature responsive instrument is inserted into a liquid container at the feed end of the pasteurizer, withdrawn from the container at the discharge end of the pasteurizer and automatically returned to the feed end of the machine to permit a second temperature recording cycle to be started immediately.

A further object of the present invention is to provide novel temperature recording apparatus for pasteurizers wherein a tractor member is mounted on a track extending the length of the pasteurizer to carry the temperature responsive instrument and is conveyed through the pasteurizer by engagement with the liquid containers.

A still further object of the present invention is to provide novel temperature recording apparatus for pasteurizers having the features and characteristics set forth which is readily adaptable for use with presently existing pasteurizers, may be manufactured easily and cheaply and is entirely efficient and effective in operation and use.

These and other objects of the present invention and the various features and details of the operation and construction thereof are hereinafter more fully set forth and described with reference to the accompanying drawings, in which:

Fig. 1 is a side elevational view partially in section of a pasteurizer embodying temperature recording apparatus of the present invention;

Fig. 2 is a plan view partially in section of the pasteurizer illustrated in Fig. 1;

Fig. 3 is an enlarged fragmentary end elevational view partially in section of the feed end of the pasteurizer;

Fig. 4 is an enlarged fragmentary side elevational view of the feed end of the pasteurizer illustrating the mechanism to return the temperature responsive instrument to the feed end of the machine after it has been passed through the pasteurizer;

Fig. 5 is an enlarged side elevational view of the tractor for conveying the temperature responsive instrument through the pasteurizer and the means for supporting the tractor therein;

Fig. 6 is a transverse sectional view taken on line 6—6, Fig. 5 illustrating the means for mounting the tractor;

Fig. 7 is a transverse sectional view taken on line 7—7, Fig. 5 illustrating the mounting of the electric cord which connects the temperature responsive instrument with the temperature recorder;

Fig. 8 is a sectional plan view taken on line 8—8 Fig. 1, illustrating the tractor and the construction of the track at the discharge end of the pasteurizer;

Fig. 9 is a side elevational view of the track and tractor illustrated in Fig. 8;

Fig. 10 is a transverse sectional view taken on line 10—10, Fig. 8, illustrating the electric switches for stopping the operation of the pasteurizer and for permitting the tractor to return to the feed end of the machine;

Fig. 11 is a plan view of the track for mounting the tractor at the feed end of the pasteurizer;

Fig. 12 is a transverse sectional view taken on line 12—12, Fig. 11, illustrating the electric switch for stopping the return movement of the tractor; and, Fig. 13 is a schematic wiring diagram of a pasteurizer embodying the temperature recording apparatus of the present invention.

Referring more specifically to the drawings and particularly Figs. 1 and 2 thereof, reference numeral 10 designates generally a pasteurizer comprising a housing 11 containing a continuously operating endless conveyor 12 which transports liquid containers 13 through the pasteurizer. A track 14 is mounted interiorly of the housing 11 above the conveyor 12 extending from the feed end 10a of the pasteurizer 10 to the discharge end 10b and mounts a tractor 15 which conveys a thermocouple 16 back and forth through the pasteurizer. The thermocouple 16 is connected by means of an electric cord 17 to a standard temperature-time recording instrument 18 mounted at one end of the pasteurizer, as indicated in Figs. 3 and 4, which produces a permanent record of the temperature and time relationship of the liquid being pasteurized.

The track 14 which mounts the tractor 15 extends longitudinally of the pasteurizer 10 substantially along the central axis thereof above the tops of the liquid containers carried by the conveyor 12. The forward end of the track 14 at the feed end of the pasteurizer is arcuate and extends toward one side of the feed end of the machine to permit easy access thereto by the operator of the machine. A plurality of supporting brackets 21 having T-slots 22 therein are secured to the housing 11 and support the track 14, as illustrated in Figs. 5 and 6.

In accordance with the present invention, the tractor 15 is mounted on the track 14 for relative movement longitudinally of the housing. The tractor 15 comprises a central body portion 23 having upwardly extending supporting yokes 24 and 25 at opposite ends thereof which mount pairs of rollers 26, 26 and 27, 27, respectively. The pairs of rollers 26 and 27 in turn are engaged in guideways or channels 14a, 14a at opposite sides of the track 14 to permit free movement of the tractor 15 relative to the track 14. The body portion 23 of the tractor 15 also has a pair of horizontal, generally oval shaped guide members 28 and 29 at the forward and rear ends thereof, respectively, which engage limit switches, as more fully described hereinafter.

When the tractor 15 is at the feed end of the track 14 the guide members 28 and 29 bear against an arcuate side rail 32 mounted adjacent the inner surface of the track 14, and the guide 29 pivots a switch actuating member 33 about its pivot point 34 into engagement with a single-pole double-throw switch 35 closing a circuit through the switch 35 to a signal light 36 thereby indicating to the operator of the pasteurizer that the tractor 15 is in position at the feed end of the pasteurizer.

In this position of the tractor 15 the thermocouple 16 may be placed in a liquid container 13 to indicate the temperature of the liquid. In the illustrated embodiment of the present invention the containers 13 are shown as bottles and the thermocouple is placed in an uncrowned bottle and sealed therein by an adaptor nut 37. The adaptor nut 37 comprises a cap member 38 having a semi-circular flange 39 thereon and a gasketed adjusting bolt 42 which may be threaded in the adaptor nut and into sealing engagement with the bottle.

During movement of the tractor 15 through the pasteurizer the tractor pulls the electric cord 17 and a return cable 44 through the pasteurizer thereby preventing undue strain on the junction between the cord 17 and thermocouple 16. To accomplish this a bracket 45 and an adjustable clamp 46 are mounted on the tractor guide member 29, as illustrated in Fig. 5, which engage the cable 44 and electric cord 17, respectively. An important feature of the present invention is the provision of an arm 47 pivotally secured to the tractor body 23 as indicated at 48 and operable to be maintained in a vertical position by a spring-biased latch 49 in engagement with the liquid containers 13 carried by the conveyor 12. By this construction, the liquid containers 13 provide the necessary force to pull the tractor 15 through the pasteurizer.

The cord 17 is carried by a plurality of cord carriers 52 secured to the cord 17 at predetermined spaced intervals. The carriers 52 comprise a yoke 53 having rollers 54 at the upper end thereof and a split rivet 55 at the base which is secured to the cord. When the tractor 15 is at the feed end of the pasteurizer the cord 17 is maintained in a coiled position, as indicated in Fig. 11 above the tops of the liquid containers 13 and, as the tractor moves toward the discharge end of the pasteurizer the cord 17 is pulled to a substantially horizontal position.

As the tractor 15 approaches the discharge end of the pasteurizer the guide members 28 and 29 engage a guide rail 57 mounted adjacent one side of the discharge end of the track 14, as illustrated in Fig. 8. The forward guide 28 then engages a switch actuating arm 58 pivotally mounted adjacent the discharge end of the track 14 as indicated at 59 and normally biased inwardly towards the track 14 by a coil spring 62. A normally open switch 63 is positioned adjacent the switch actuating arm 58 and is closed upon the outward pivotal movement of the arm 58. Closing the switch 63 completes a circuit through a warning buzzer 64 and a signal light 65 thereby indicating to the operator of the machine that the tractor is adjacent the discharge end of the pasteurizer.

Upon further movement of the tractor 15 toward the discharge end of the pasteurizer a second switch actuating arm 66 is engaged by the guide member 28. The arm 66 is pivoted as indicated at 67 in Fig. 8 and carries an operating bracket 69 operable to engage a pair of microswitches 72 and 73. The microswitch 72 is a normally open switch which is engaged and closed by the operating bracket 69 prior to actuation of the switch 73 and is mounted in series with a manually operated push button switch 74. When a circuit is completed through the switches 72 and 74 the tractor 15 will be pulled toward the feed end of the machine. Further movement of the tractor 15 to the discharge end of the machine will cause the operating bracket 69 to engage and open the normally closed switch 73 thereby stopping operation of the pasteurizer.

The switch 73 is a safety switch and during normal operation of the machine will remain closed at all times. Before the tractor 15 reaches a position which causes the switch 73 to be opened the operator of the machine will actuate a latch release rod 75 mounted on the latch 49 thereby disengaging the latch 49 from the arm 47 permitting the arm 47 to be moved upwardly to a substantially horizontal position out of the path of the liquid containers 13 and into engagement with a spring catch 76, as illustrated in Figs. 5 and 6. This will stop the movement of the tractor 15 toward the discharge end of the pasteurizer and prevent the switch 73 from being opened. The machine operator then releases the adaptor nut 37 and removes the thermocouple 16 from the liquid container 13. The thermocouple 16 is then placed in a receiver 77 mounted on the tractor body 23 where it is frictionally maintained in position by a leaf spring 78. The tractor 15 is now ready to be returned to the feed end of the pasteurizer.

When the tractor is in this position with the arm 47 out of engagement with the liquid containers and the thermocouple 16 in the receiver 77, as indicated in broken lines in Fig. 5, the operator of the machine may then close the manually actuated push button switch 74 and start a return motor 82 which is mounted on top of the feed end of the pasteurizer, as indicated in Fig. 4. At the same time a coil 83 for a magnetic clutch 84 is energized thereby completing a driving connection to a drum 85 about which the return cable 44 is wound. The return cable 44 thus pulls the tractor 15 back through the pasteurizer to the feed end of the pasteurizer. As the tractor reaches the feed end of the pasteurizer the guide 29 engages and actuates the switch actuating arm 33 actuating the single-pole double-throw switch 35 to a position which stops the return motor 82, deenergizes the coil 83 for the magnetic clutch 84 and at the same time energizes the signal 36. This completes one cycle of operation of the temperature recording apparatus and the tractor and thermocouple are in a position to start a second temperature recording cycle.

Fig. 13 is a schematic wiring diagram of a pasteurizer embodying the temperature recording apparatus of the present invention. With reference to Fig. 13 a two-phase motor 86 is connected to lead lines 87, 88, 89 and 90 through a start switch 91 and a relay 92 connected in series with the switch 91, and the pasteurizer motor 86 is energized when the switch 91 and relay 92 are closed. While the pasteurizer is operating the thermocouple 16 is inserted into a liquid container 13 and the arm 47 is moved to a vertical position among the containers 13 thereby causing the tractor and thermocouple to be moved through the pasteurizer along with the containers 13. As the thermocouple is moved through the pasteurizer a permanent record of the temperature of the liquid is made on the temperature recorder 18.

As the tractor 15 approaches the discharge end of the pasteurizer the normally open switch 63 is closed completing a circuit from one side of the line 88 through the conductor 94, switch 63 and conductor 95 to a relay coil 96 and then back to the other side of the line 87 through a conductor 97. Energizing the relay coil 96 closes a relay 98 which completes a circuit to the warning buzzer 64 and signal light 65 indicating to the operator of the machine that the tractor is approaching the discharge end of the pasteurizer. Further movement of the tractor 15 closes the switch 72 which is in series with the start switch 74 for the return motor 82. After the tractor is disengaged from the liquid containers and the thermocouple placed in its receiver in the tractor the switch 74 may be closed completing a circuit to a relay coil 100 from one side of the line 88 through a conductor 101, the switch 35, and conductor 102, the switch 74, conductor 103, the switch 72 and a conductor 104 to the relay coil 100 and then through a conductor 105 to the other side of the line 87. This actuates a relay 106 completing a circuit to the return motor 82 and the coil 83 for the magnetic clutch 84 thereby causing the tractor 15 to be pulled to the feed end of the pasteurizer.

If the movement of the tractor to the discharge end of the machine is not halted before the switch 73 is actuated a holding circuit for a relay coil 107 will be broken deenergizing the relay coil 107 and opening the relay 92 thereby breaking the circuit to the pasteurizer motor 86. Closing the switch 73 will complete a circuit from one side of the line 87 through a conductor 108 and through a normally closed stop switch 109 for the pasteurizer motor 86, through a conductor 110, the switch 73, and conductor 111, through the relay contacts 112 and 113, and a conductor 114 to the coil 107 and then back to the other side of the line 88 through a conductor 115. In order to again start the pasteurizer motor 86 a normally open start switch 116 must be closed which will again energize the coil 107.

When the tractor approaches the feed end of the machine the switch 35 is actuated from the position illustrated in Fig. 13 to a position wherein a circuit is completed through a contact 118 to the signal light 36 indicating to the operator of the machine that the tractor and thermocouple are in position to start another temperature recording cycle. This actuation of the switch 35 will disconnect the circuit through a contact 119 thereby breaking the holding circuit for the relay coil 100. The relay 106 will then be deenergized opening the circuit to the return motor 82 and magnetic clutch coil 83. Thus the tractor 15 and thermocouple 16 may be continuously moved back and forth through the pasteurizer to obtain an accurate continuous record of the temperature and time relationship of the liquid being pasteurized.

From the foregoing it will be observed that the present invention provides a novel temperature recording apparatus for pasteurizers wherein an accurate temperature-time record may be obtained of a liquid passing through pasteurizer by inserting a thermocouple into the liquid and transporting the thermocouple through the pasteurizer with the liquid container. In addition, the present invention provides novel temperature recording apparatus of the type described wherein a tractor is mounted on an overhead track in the pasteurizer to pull the cord for the thermocouple through the pasteurizer and return the thermocouple to the feed end of the pasteurizer after completing a temperature-time record.

While a particular embodiment of the present invention has been illustrated and described herein it is not intended to limit the invention to such a disclosure and changes and modifications may be incorporated and embodied therein within the scope of the following claims.

I claim:

1. In temperature recording apparatus for pasteurizers through which a plurality of liquid containers are conveyed in one direction comprising a temperature responsive instrument electrically connected with a temperature-time recorder, means to support said temperature responsive instrument in one of said liquid containers during passage through the pasteurizer in said one direction, a member movable through said pasteurizer with the temperature responsive instrument, means mounting said member for movement in the pasteurizer relative to the liquid containers, and means to withdraw the member and the temperature responsive instrument through the pasteurizer in the opposite direction.

2. In temperature recording apparatus for pasteurizers through which a plurality of liquid containers are conveyed in one direction comprising a temperature responsive instrument electrically connected with a temperature-time recorder, means to support said temperature responsive instrument in one of said liquid containers during passage through the pasteurizer in said one direction, a member movable through said pasteurizer with the temperature responsive instrument, means mounting said member for movement in the pasteurizer relative to the liquid containers, and means including a motor and clutch actuatable after said member has completed passage through the pasteurizer in said one direction to withdraw the member and temperature responsive instrument through the pasteurizer in the opposite direction.

3. In temperature recording apparatus for pasteurizers through which a plurality of liquid containers are conveyed in one direction comprising a temperature responsive instrument electrically connected with a temperature-time recorder, means to support said temperature responsive instrument in one of said liquid containers during passage through the pasteurizer in said one direction, a member movable through said pasteurizer with the temperature responsive instrument and operable to receive and support the same at the end of the movement of the temperature responsive instrument through the pasteurizer in the said one direction, means mounting said member for relative movement in the pasteurizer above the liquid containers, and means including a motor and clutch actuatable after said member has completed passage through the pasteurizer in said one direction to withdraw the member through the pasteurizer in the opposite direction.

4. In temperature recording apparatus for pasteurizers through which a plurality of liquid containers are conveyed in one direction comprising a temperature responsive instrument electrically connected with a temperature-time recorder, means to support said temperature responsive instrument in one of said liquid containers during passage through the pasteurizer in said one direction, a member movable through said pasteurizer with the temperature responsive instrument and operable to receive and support the same at the end of the movement of the temperature responsive instrument through the pasteurizer in the said one direction, means mounting said member for relative movement in the pasteurizer above the liquid containers, means including a motor and clutch actuatable after said member has completed passage through the pasteurizer in said one direction to withdraw the member through the pasteurizer in the opposite direction, and an electric circuit including a switch actuatable by said member to stop operation of the electric motor and disengage the clutch upon completion of passage of the member through the pasteurizer in the opposite direction.

5. In temperature recording apparatus for pasteurizers through which a plurality of liquid containers are conveyed in one direction comprising a temperature responsive instrument electrically connected with a temperature-time recorder, means to support said temperature responsive instrument in one of said liquid containers during passage through the pasteurizer in said one direction, a tractor member interconnected with said temperature responsive instrument and mounted within said pasteurizer for longitudinal movement through the pasteurizer relative to the liquid containers, said tractor member operable to be moved through said pasteurizer along with said temperature responsive instrument during the pasteurizing process, and actuating means to withdraw said tractor member in the opposite direction through said pasteurizer after the tractor member has completed passage therethrough in said one direction.

6. In temperature recording apparatus for pasteurizers through which a plurality of liquid containers are conveyed in one direction comprising a temperature responsive instrument electrically connected with a temperature-time recorder, means to support said temperature responsive instrument in one of said liquid containers during passage through the pasteurizer in said one direction to obtain the temperature of the liquid therein during the pasteurizing process, a tractor member interconnected with said temperature responsive instrument and mounted within said pasteurizer for longitudinal movement through the pasteurizer relative to said containers, said tractor member operable to be moved through said pasteurizer along with said temperature responsive instrument during the pasteurizing process, a receptacle on said tractor member to receive said temperature responsive instrument at the end of the pasteurizing process, an actuating means to withdraw said tractor member in the opposite direction through said pasteurizer after the tractor member has completed passage therethrough in said one direction.

7. In temperature recording apparatus for pasteurizers through which a plurality of liquid containers are conveyed in one direction comprising a temperature responsive instrument electrically connected with a temperature-time recorder, means to support said temperature responsive instrument in one of said liquid containers during passage through the pasteurizer in said one direction to obtain the temperature of the liquid therein during the pasteurizing process, an overhead track mounted above the liquid containers being conveyed through the pasteurizer and extending the full length of said pasteurizer, a tractor member mounted on said overhead track for relative longitudinal movement in said pasteurizer, and an electric circuit including switch mechanism operable to be actuated by said tractor member and give a signal when said tractor member approaches the end of its passage through the pasteurizer in said one direction.

8. In temperature recording apparatus for pasteurizers through which a plurality of liquid containers are conveyed in one direction comprising a temperature responsive instrument electrically connected with a temperature-time recorder, means to support said temperature responsive instrument in one of said liquid containers during passage through the pasteurizer in said one direction to obtain the temperature of the liquid therein during the pasteurizing process, an overhead track mounted above the liquid containers being conveyed through the pasteurizer and extending the full length of said pasteurizer, a tractor member mounted on said overhead track for relative longitudinal movement in said pasteurizer, an electric circuit including a first switch mechanism operable to be actuated by said tractor member and give a signal when said tractor member approaches the end of its passage through the pasteurizer in said one direction, and second switch mechanism operable to stop operation of said pasteurizer when the tractor member completes passage in said one direction through the pasteurizer.

9. In temperature recording apparatus for pasteurizers through which a plurality of liquid containers are conveyed in one direction comprising a temperature responsive instrument electrically connected with a temperature-time recorder, means to support said temperature responsive instrument in one of said liquid containers during passage through the pasteurizer in said one direction to obtain the temperature of the liquid therein during the pasteurizing process, an overhead track mounted above the liquid containers being conveyed through the pasteurizer and extending the full length of said pasteurizer, a tractor member mounted on said overhead track for longitudinal movement in said pasteurizer relative to said containers, an electric circuit including a first switch mechanism operable to be actuated by said tractor member and give a signal when said tractor member approaches the end of its passage through the pasteurizer in said one direction, a receptacle on said tractor member to receive said temperature responsive instrument at the end of the pasteurizing process, and means operable to withdraw said tractor member in the opposite direction through said pasteurizer.

10. In temperature recording apparatus for pasteurizers through which a plurality of liquid containers are conveyed in one direction comprising a temperature responsive instrument electrically connected with a temperature-time recorder, means to support said temperature responsive instrument in one of said liquid containers during passage through the pasteurizer in said one direction to obtain the temperature of the liquid therein during the pasteurizing process, an overhead track mounted above the liquid containers being conveyed through the pasteurizer and extending the full length of said pasteurizer, a tractor member mounted on said overhead track for longitudinal movement in said pasteurizer relative to said containers, an electric circuit including a first switch mechanism operable to be actuated by said tractor member and give a signal when said tractor member approaches the end of its passage through the pasteurizer in said one direction, second switch mechanism operable to stop operation of said pasteurizer when the tractor member completes passage in said one direction through the pasteurizer, a receptacle on said tractor member to receive said temperature responsive instrument at the end of the pasteurizing process, means to withdraw said tractor member in the opposite direction through said pasteurizer after the tractor member has completed passage therethrough in said one direction, and third switch mechanism actuatable by said tractor member to stop passage of the tractor member in said opposite direction.

11. In temperature recording apparatus for pasteurizers through which a plurality of liquid containers are conveyed in one direction comprising a temperature responsive instrument electrically connected with a temperature-time recorder, means to support said temperature responsive instrument in one of said liquid containers during passage through the pasteurizer in said one direction to obtain the temperature of the liquid therein during the pasteurizing process, a tractor member mounted for longitudinal movement in said pasteurizer relative to said containers, an arm mounted on said tractor member for pivotal movement between predetermined limit positions and operable in one limit position thereof to be engaged by said liquid containers and move said tractor member through said pasteurizer with the containers, a receptacle on said tractor member to receive said temperature responsive instrument at the end of the pasteurizing process, and means to withdraw said tractor member in the opposite direction through said pasteurizer.

12. In temperature recording apparatus for pasteurizers through which a plurality of liquid containers are conveyed in one direction comprising a temperature responsive instrument electrically connected with a temperature-time recorder, means to support said temperature responsive instrument in one of said liquid containers during passage through the pasteurizer in said one direction to obtain the temperature of the liquid therein during the pasteurizing process, an overhead track mounted above the liquid containers being conveyed through the pasteurizer and extending the full length of said pasteurizer, a tractor member mounted on said overhead track for relative longitudinal movement in said pasteurizer, an arm mounted on said tractor member for pivotal movement between predetermined limit positions and operable in one limit position thereof to be engaged by said liquid containers and move said tractor member through said pasteurizer with the containers, a spring biased latch mounted in engagement with said arm to maintain the arm in said one limit position, a receptacle on said tractor member to receive said temperature responsive instrument at the end of the pasteurizing process, and means to withdraw said tractor member in the opposite direction through said pasteurizer.

13. In temperature recording apparatus for pasteurizers through which a plurality of liquid containers are conveyed comprising a temperature responsive instrument electrically connected with a temperature-time recorder, an electric cord of a length greater than the length of the pasteurizer interconnecting said temperature responsive instrument with said recorder, means to support said temperature responsive instrument in one of said liquid containers during passing through the pasteurizer in one direction to obtain the temperature of the liquid therein during the pasteurizing process, an overhead track mounted above the liquid containers being conveyed through the pasteurizer and extending the full length of said pasteurizer, a tractor member mounted on said overhead track for relative longitudinal movement in said pasteurizer, said tractor member secured to said electric cord and operable to pull said cord through the pasteurizer during passage of the tractor member thru the pasteurizer in said one direction, an arm mounted on said tractor member for pivotal movement between predetermined limit positions and operable in one limit position thereof to be engaged by said liquid containers and move said tractor member through said pasteurizer with the containers, a spring biased latch mounted in engagement with said arm to maintain the arm in said one limit position, a receptacle on said tractor member to receive said temperature responsive instrument at the end of the pasteurizing process, actuating means including an electric motor and a clutch operable to withdraw said tractor member in the opposite direction through said pasteurizer after the tractor member has completed passage therethrough in said one direction, and switch mechanism actuatable by said tractor member to stop operation of said motor and disengage said clutch upon completion of the passage of the tractor member in said opposite direction.

14. In temperature recording apparatus for pasteurizers through which a plurality of liquid containers are conveyed comprising a temperature responsive instrument electrically connected with a temperature-time recorder, an electric cord of a length greater than the length of the pasteurizer interconnecting said temperature responsive instrument with said recorder, means to support said temperature responsive instrument in one of said liquid containers during passage through the pasteurizer in one direction to obtain the temperature of the liquid therein during the pasteurizing process, an overhead track mounted above the liquid containers being conveyed through the pasteurizer and extending the full length of said pasteurizer, a tractor member mounted on said overhead track for relative longitudinal movement in said pasteurizer, said tractor member secured to said electric cord and operable to pull said cord through the pasteurizer during passage of the tractor member thru the pasteurizer in said one direction, an arm mounted on said tractor member for pivotal movement between predetermined limit positions and operable in one limit position thereof to be engaged by said liquid containers and move said tractor member through said pasteurizer with the containers, a spring biased latch mounted in engagement with said arm to maintain the arm in said one limit position, an electric circuit including a first switch mechanism actuatable by said tractor member to give a signal when said tractor member approaches the end of its passage through the pasteurizer in said one direction, a receptacle on said tractor member to receive said temperature responsive instrument at the end of the pasteurizing process, actuating means including an electric motor and a clutch operable to withdraw said tractor member in the opposite direction through said pasteurizer after the tractor member has completed passage therethrough in said one direction, and second switch mechanism actuatable by said tractor member to stop operation of said motor and disengage said clutch upon completion of the passage of the tractor member in said opposite direction.

References Cited in the file of this patent

UNITED STATES PATENTS

| Number | Name | Date |
| --- | --- | --- |
| 842,981 | Tagliabue | Feb. 5, 1907 |
| 2,042,032 | Webster | May 26, 1936 |